US011025854B2

(12) United States Patent
Galluzzi et al.

(10) Patent No.: US 11,025,854 B2
(45) Date of Patent: Jun. 1, 2021

(54) METHOD OF INTEGRATING DRIVER ASSISTANCE SYSTEMS IN VEHICLES, CORRESPONDING SYSTEM, CIRCUIT, KIT AND VEHICLE

(71) Applicant: STMicroelectronics S.r.l., Agrate Brianza (IT)

(72) Inventors: Allessandro Vittorio Galluzzi, San Giuliano Milanes (IT); Riccardo Parisi, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/179,542

(22) Filed: Nov. 2, 2018

(65) Prior Publication Data
US 2019/0141275 A1    May 9, 2019

(30) Foreign Application Priority Data

Nov. 7, 2017   (IT) .............................. 1020170126520

(51) Int. Cl.
*H04N 5/38*       (2006.01)
*B60R 1/00*       (2006.01)
(Continued)

(52) U.S. Cl.
CPC ............... *H04N 5/38* (2013.01); *B60Q 9/008* (2013.01); *B60R 1/00* (2013.01); *G08G 1/04* (2013.01); *G08G 1/163* (2013.01); *G08G 1/165* (2013.01); *G08G 1/166* (2013.01); *G08G 1/167* (2013.01); *H04N 7/18* (2013.01); *H04N 21/00* (2013.01); *H04N 21/2187* (2013.01); *B60R 2300/20* (2013.01); *B60R 2300/207* (2013.01); *B60R 2300/302* (2013.01); *B60R 2300/804* (2013.01);
(Continued)

(58) Field of Classification Search
None
See application file for complete search history.

(56) References Cited

U.S. PATENT DOCUMENTS 6,028,537 A  *  2/2000  Suman ................... B60K 35/00
                                                    340/988
6,259,475 B1     7/2001  Ramachandran et al.
(Continued)

FOREIGN PATENT DOCUMENTS

CN        204206332 U       3/2015
CN        105898202 A       8/2016
(Continued)

OTHER PUBLICATIONS

Techtime Electronics & Technology News, "i4drive and Japanese Rico to develop new ADAS," May 3, 2016, https://techtime.news/, 3 pages
(Continued)

*Primary Examiner* — Rebecca A Volentine
(74) *Attorney, Agent, or Firm* — Slater Matsil, LLP (57) ABSTRACT

In one embodiment of the present invention, a method includes providing a camera on a vehicle; supplying video frames from the camera to video signal handling circuitry in a mobile communication device; and actuating the video signal handling circuitry in the mobile communication device to produce driver assistance signals based on the video frames.

16 Claims, 4 Drawing Sheets

(51) Int. Cl.

| | | |
|---|---|---|
| *H04N 21/2187* | (2011.01) | |
| *H04N 7/18* | (2006.01) | |
| *H04N 21/00* | (2011.01) | |
| *B60Q 9/00* | (2006.01) | |
| *G08G 1/04* | (2006.01) | |
| *G08G 1/16* | (2006.01) | |
| *H04L 29/08* | (2006.01) | |
| *H04W 4/40* | (2018.01) | |
| *G06K 9/00* | (2006.01) | |

(52) U.S. Cl.
CPC ............... *B60R 2300/8033* (2013.01); *B60R 2300/8046* (2013.01); *G06K 9/00791* (2013.01); *H04L 67/12* (2013.01); *H04W 4/40* (2018.02)

(56) References Cited

U.S. PATENT DOCUMENTS

| | | | | |
|---|---|---|---|---|
| 9,718,405 | B1* | 8/2017 | Englander | G01S 19/13 |
| 2004/0049789 | A1* | 3/2004 | Bower | H04N 21/2146 |
| | | | | 725/75 |
| 2009/0315992 | A1 | 12/2009 | Haug | |
| 2011/0169626 | A1* | 7/2011 | Sun | G08G 1/09623 |
| | | | | 340/439 |
| 2014/0111647 | A1* | 4/2014 | Atsmon | H04N 7/185 |
| | | | | 348/148 |
| 2015/0100633 | A1 | 4/2015 | Barrett et al. | |
| 2015/0307048 | A1 | 10/2015 | Santora | |
| 2016/0006922 | A1* | 1/2016 | Boudreau | H04N 5/23206 |
| | | | | 348/207.1 |
| 2016/0197783 | A1 | 7/2016 | Hort et al. | |
| 2016/0325680 | A1* | 11/2016 | Curtis | B60R 1/00 |
| 2016/0379422 | A1* | 12/2016 | Kahn | G01D 7/00 |
| | | | | 701/36 |
| 2017/0072850 | A1* | 3/2017 | Curtis | B60W 50/0097 |
| 2017/0106750 | A1* | 4/2017 | Tauchi | B60R 1/00 |
| 2017/0339401 | A1* | 11/2017 | Mishima | H04N 7/181 |
| 2017/0353698 | A1* | 12/2017 | Bai | B60R 1/00 |
| 2018/0301095 | A1 | 10/2018 | Runyan et al. | |

FOREIGN PATENT DOCUMENTS

| | | |
|---|---|---|
| CN | 106469477 A | 3/2017 |
| CN | 106671922 A | 5/2017 |
| CN | 209290279 U | 8/2019 |
| WO | 2007093471 A1 | 8/2007 |

OTHER PUBLICATIONS

Pearl Rearvision, "RearVision: A redefined Wireless Backup Camera System," http://pearlauto.com/, Jul. 25, 2017, 7 pages.

* cited by examiner

METHOD OF INTEGRATING DRIVER ASSISTANCE SYSTEMS IN VEHICLES, CORRESPONDING SYSTEM, CIRCUIT, KIT AND VEHICLE

CROSS-REFERENCE TO RELATED APPLICATIONS

This application claims priority to Italian Patent Application No. 102017000126520, filed on Nov. 7, 2017, which application is hereby incorporated herein by reference.

TECHNICAL FIELD

The description relates to driver assistance systems for vehicles such as motor vehicles.

BACKGROUND

Cameras such as rearview (or "backup") cameras are currently installed in motor vehicles as an optional feature.

Legislation is under way in certain countries intended to render a rearview camera a compulsory equipment for all new cars for safety reasons.

A rearview camera allows a driver, when reversing, to see an image of the area just behind a car e.g. via a camera mounted on the car rear bumper.

This facilitates avoiding e.g. inadvertent pedestrian back-over crashes during reversing.

Different approaches can be adopted in integrating a rearview camera (and an associated monitor) in a motor vehicle.

For instance, a rearview camera and a monitor for displaying the images from the rearview camera can be included as original vehicle equipment (OEM) installed at the factory, possibly together with touchscreen navigation features and Bluetooth for hands-free phone calls. In certain cases, a monitor can be provided as a small monitor located in a rearview mirror on the driver's side.

A vehicle not provided with such original equipment can be "retro-fitted" with a rearview camera and an associated monitor. For instance, this may occur while replacing a factory-installed radio with a smarter radio, which may have associated e.g. a GPS viewing screen which may be exploited for displaying rearview camera images when the vehicle is in reverse.

Such upgrade will normally involve a relatively high cost, possibly justified (only) by additional benefits to rearview camera alone.

Another option may include a "kit" including a rearview camera for mounting e.g. at the car plate and an associated stand-alone monitor.

Solutions are available where a smart phone can be used to display rearview camera images, e.g. by sending the rearview camera images over a WiFi connection to a specific device that redirects the frame to the smart phone.

Italian Patent application 102017000088321 (not yet available to the public at the time of filing of the instant application) discloses a method (and corresponding system, circuit, kit and motor vehicle) wherein a rearview camera is provided on a vehicle equipped with a radio equipment, with video frames from the rearview camera received at the radio equipment and transmitted to a mobile communication device such as a smart phone equipped with a video screen so that video frames from the rearview camera are displayed on the video screen of the mobile communication device.

In certain countries (Russia being a case in point), a widespread use is made, also with possible forensic relevance, e.g. as a measure against insurance fraud, of front cameras such as "dashboard" cameras, briefly "dash cams".

A dashboard camera (also referred to as car DVR or car black box) is an onboard camera that continuously records the view through the windscreen of a vehicle. It may be mounted e.g. in the passenger compartment, not necessarily on the dashboard: for instance it can be mounted on the inner surface of the windscreen by suction cup or adhesive-tape mount.

Front cameras such as dashboard cameras may provide video evidence in the event of a road accident. During parking, these cameras can still can capture video evidence if vandalism act is detected.

While currently in use in the automotive context mostly as an optional feature, advanced driver-assistance systems (ADAS) are becoming increasingly popular.

Advanced driver-assistance systems are systems developed to automate/adapt/enhance vehicle systems for safety and better driving. For instance, safety features may be devised to avoid collisions and accidents by offering technologies that alert the driver of potential problems and/or to avoid collisions by implementing safeguards and taking over control of the vehicle.

Adaptive features may e.g. automate lighting, provide adaptive cruise control, automate braking, incorporate GPS/traffic warnings, connect to smart phones, alert driver to other cars or dangers, keep the driver in the correct lane, or show what is in blind spots.

Certain products available on the market (see e.g., document titled "i4drive-Rico ADAS" available at http://news-.techtime.co.il/2016/05/03/adas/, which is filed in an Information Disclosure Statement) permit to equip a car with an ADAS by installing external devices.

SUMMARY

In one embodiment of the present invention, a method comprises providing a camera on a vehicle; supplying video frames from the camera to video signal handling circuitry in a mobile communication device; and actuating the video signal handling circuitry in the mobile communication device to produce driver assistance signals based on the video frames.

In another embodiment of the present invention, a system includes a camera for mounting on a vehicle equipped with a radio equipment. The radio equipment is configured to sense an operational status of the vehicle and cause video frames from the camera to be supplied to video signal handling circuitry in a mobile communication device based on the operational status of the vehicle.

In another embodiment of the present invention, a vehicle radio equipment circuit comprises a video signal receiver circuit configured to receive video signals conveying video frames from a vehicle camera. A video signal transmitter circuit is configured to transmit the video frames received at the radio equipment from the camera to a mobile communication device equipped with video signal handling circuitry. The video frames from the camera are available to the video signal handling circuitry to produce driver assistance signals based on the video frames.

In another embodiment of the present invention, a kit includes a camera and a radio equipment for mounting on a vehicle. The radio equipment comprises a video signal receiver circuit that is configured to receive video signals conveying video frames from the camera. The radio equipment also includes a video signal transmitter circuit that is configured to transmit the video frames received at the radio equipment from the camera to a mobile communication device equipped with video signal handling circuitry. The video frames are available to the video signal handling circuitry to produce driver assistance signals based on the video frames.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

One or more embodiments may apply to "after-market" or "retrofit" equipping of motor vehicles with driver assistance systems.

Despite the activity discussed in the foregoing, improvements are desirable in order to expand the use of advanced driver-assistance systems, while addressing various issues possibly related to the use of advanced driver-assistance systems on board of vehicles.

For instance, reducing the cost of "retrofitting" an existing vehicle with ADAS features may facilitate the diffusion of such systems.

The capability of interfacing with the "infotainment" system of the vehicle (e.g. the ability of exploiting data/messages from the CAN subsystem in the vehicle) may represent another desirable feature.

An accurate installation, not easy to be tampered with, possibly certified by a qualified operator, may represent a point of interest e.g. for increasing system safety.

An object of one or more embodiments is to contribute in providing such an improved solution.

According to one or more embodiments, such an object can be achieved by means of a method having the features set forth in the claims that follow.

One or more embodiments may relate to a corresponding system, a corresponding circuit as well as to a corresponding kit (e.g. for use in "retro-fitting" existing vehicles) and a corresponding motor vehicle.

The claims are an integral part of the technical teaching provided herein in respect of the embodiments.

One or more embodiments make it possible to provide a vehicle with ADAS features at a reduced cost, e.g. without having to install various extra devices, a video camera possibly being the only additional device installed in the car.

One or more embodiments can be associated effectively with other "aftermarket" products by making these more appealing for the final user.

In one or more embodiments, using a mobile communication device (e.g. a user equipment such as a smart phone or the like) as a gateway makes it possible to cover a variety of use contingencies. For example, information coming from the vehicle can be used to trigger some specific event (crash detection).

The solution will allow a final user to upgrade the existing radio with new features.

One or more embodiments may be based on the recognition that car radio systems such as 1DIN (ISO7736), which currently represent the majority of OEM and aftermarket systems, are not suitable to host ADAS features because they do not have proper CPU capabilities and a video display (e.g. LCD).

One or more embodiments may overcome that limitation by using the display and CPU power of a driver's smart phone (or other mobile communication device) connected, e.g. via WiFi or USB, to the car radio system, so that the video signal handling circuitry and the associate data processing power of that device can perform image evaluation and other ADAS processing tasks.

In one or more embodiments, the smart phone (or other mobile communication device) may be in charge of receiving video frames from the car radio and evaluate these frames to perform certain ADAS functions (e.g. vehicle recognition, pedestrian recognition, road signal recognition). It also decodes messages coming from the radio about the vehicle status.

In one or more embodiments, the radio (e.g. 1DIN) may be in charge of receiving video frames from a camera, to compress (if needed) and send them to a smart phone (or other mobile communication device). The radio can receive messages e.g. via a CAN subsystem (or any other interface) from the car and inform the smart phone accordingly via messages (e.g. by using a dedicated protocol).

In one or more embodiments, one or more cameras, e.g. a front camera (dash camera) installed on the car may be in charge of sending video frames to the 1DIN Radio.

In one or more embodiments, any of a set of ADAS applications on the smart phone can be triggered when the phone is plugged.

One or more embodiments may thus expand the use of ADAS in vehicles, by exploiting the signal handling capability of a mobile communication device for performing ADAS processing tasks, such as various safety features to avoid collisions and accidents by alerting the driver and/or to avoid collisions by implementing safeguards and taking over control of the vehicle. As noted, ADAS processing tasks may include e.g. automated lighting, adaptive cruise control, automated braking, providing GPS/traffic warnings, connection to (other) smart phones, alert driver of other cars or dangers, keep the driver in the correct lane, or show what is in blind spots, and so on.

It will be otherwise appreciated that one or more embodiments are primarily related to possible ADAS signal processing architectures which may be provided on-board a vehicle, irrespective of the very nature and purpose of the processing tasks performed by such an architecture: the list of possible tasks provided in the foregoing it thus purely exemplary and non-limiting.

Figure 1:
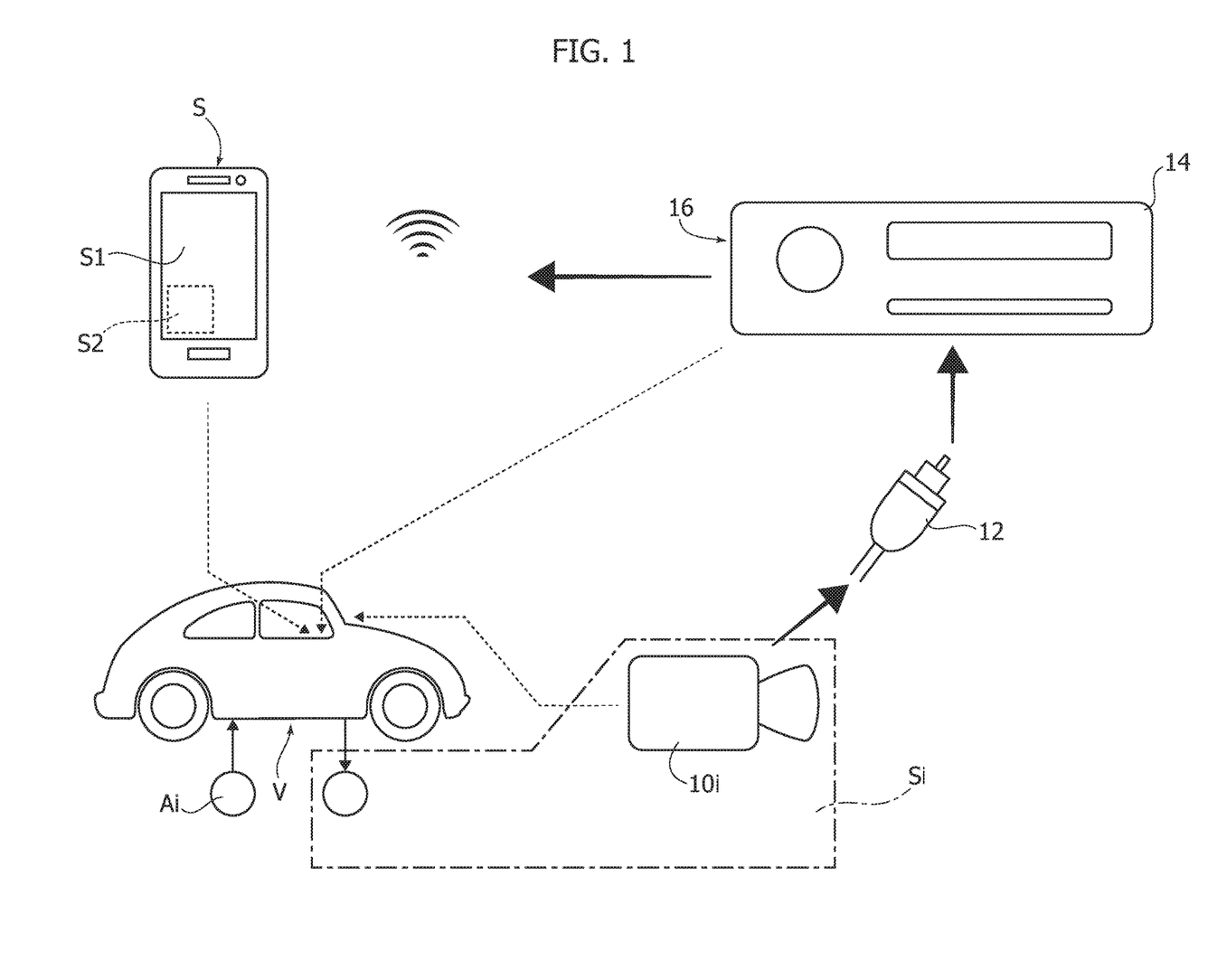
FIG. 1 is a functional diagram exemplary of embodiments.

In FIG. 1 reference V indicates a vehicle such as a motor car having installed thereon (e.g. by way of retro-fitting) one or more cameras mi. A front view ("dashboard") camera and/or a rearview ("backup") can be exemplary of such cameras, which can be of any known type as already available on the market from various sources.

In the following, a single camera (e.g. a front camera indicated 10) will be considered for the sake of simplicity without loss of generality.

One or more embodiments are related to the possibility of equipping the vehicle V (as OEM equipment or at least in part by way of retrofitting) with an advanced driver-assistance system (ADAS).

As noted, advanced driver-assistance systems are systems developed to automate/adapt/enhance vehicle systems for safety and better driving as discussed previously.

For the sake of clarity it will be once again recalled that one or more embodiments are primarily related to possible ADAS architectures which may be provided on-board a vehicle, irrespective of the very nature and purpose of the processing tasks performed by such an architecture.

For the purposes herein, such an architecture may be regarded as generally comprising:

a set of "input nodes" Si (for the purposes herein this set can be regarded as including the camera(s) 10i plus various other sensors as a function of the nature and purpose of the processing tasks performed by such an architecture) configured for providing ADAS input signals, possibly including user-generated signals;

a set of "output nodes" Ai, configured for providing ADAS output signals, possibly including alerts to the user; and ADAS processing capability for producing the output signals as a function of the input signals, such processing capability being provided via a mobile communication device (e.g. a smart phone) S as discussed in the following.

The nature and purpose of the processing tasks performed in such an architecture (see e.g. those mentioned in the foregoing purely by way of non-limiting examples and/or those referred to in the following) can be determined and selected by the user within a notionally boundless gamut of possible options.

In one or more embodiments as exemplified herein the camera 10 (as noted, a single camera will be considered here for simplicity) is coupled via a connection 12 to a car radio receiver 14 installed in the vehicle V and provided with a connection 16 (e.g. USB or WiFi, this latter designation being intended to be inclusive of Bluetooth connection) to a smart phone S or a similar mobile device (e.g. a tablet or the like) with video signal handling capability and comprising, in a manner known per se:

a video quality screen S1, that is a screen (e.g. a LCD screen) capable of providing reproduction of video signals as produced by a front view camera such as 10; and mobile communication circuitry S2 capable of handling video signals, including e.g. one or more memory unit (e.g. nonvolatile—NVM) and a transmitter (transceiver), with the circuitry S2 capable of providing "smart" elaboration e.g. rendering, encoding (e.g. in any compressed form), storing and transmitting these signals over a mobile communication network, image recognition (including vehicle recognition, pedestrian recognition and/or road signal recognition and reading), various type of editing, and so on.

Powerful smart signal handling capabilities as exemplified above (including the capability for the circuitry S2 to co-ordinate display of video signals on the screen S1) is currently provided in a wide variety of mobile communication devices to permit e.g. taking photographs (e.g. "selfies"), videos (including sound) by using one or more cameras included in the mobile communication device and storing and/or transmitting them in various formats (e.g. various messaging formats, e-mail, WhatsApp®, social media and so on).

One or more embodiments are based on the recognition that such signal handling capability, as currently provided in present-day mobile communication user equipment via powerful processors, is capable of supporting satisfactorily and reliably signal processing involved in ADAS operation, including sophisticated features.

One or more embodiments are based on the recognition that various operational conditions or status of a vehicle V can be sensed (in a manner known per se) by the radio 14, with the radio capable of receiving e.g. via a CAN subsystem (or any other interface) extensive information from the car.

In one or more embodiments, the radio 14 can be e.g. a so-called 1DIN (ISO7736) radio not equipped with an LCD display.

As noted, such a car radio system (still representing a significant quota of OEM and aftermarket car radio systems) would per se be unable to support certain signal processing tasks involved in ADAS operation.

One or more embodiments make it possible to bypass these limitations by using a driver's smart phone (or similar mobile communication equipment) connected via WiFi or USB to the car radio 14 (which may be already equipped with such communication features for synchronization with such a smart phone e.g. for hands-free phone calls).

In that way, signal processing tasks involved in ADAS operation may be performed in the driver's mobile communication device S (e.g. a smart phone or the like) by exploiting the signal handling capability available therein.

Just by way of simple example, video signals from the camera 10 (acting as one of the sensing nodes Si of the ADAS system in the vehicle V) can be:

received by the radio 14 over the connection 12;

sent towards the device S over the connection 16 to be handled by circuitry S2 (according to any of a variety of ADAS processing tasks or modes) possibly in connection with other signals/messages received at other input nodes Si to the ADAS system; and provided, as a result of processing in the device S, at output nodes Ai of the ADAS system, e.g. as actuation signals of vehicle functions and/or as alert signals for the driver, with the possibility of displaying corresponding information (e.g. time separation to preceding vehicles: see e.g. FIGS. 2 and 3) on the screen S1 of the device S.

The device S may be arranged on a support member (e.g. a support bracket in the passenger compartment) at an adequate location for access by the driver (e.g. within the driver's field of view of the device display screen and/or within driver reach to control the device S).

Figure 2:
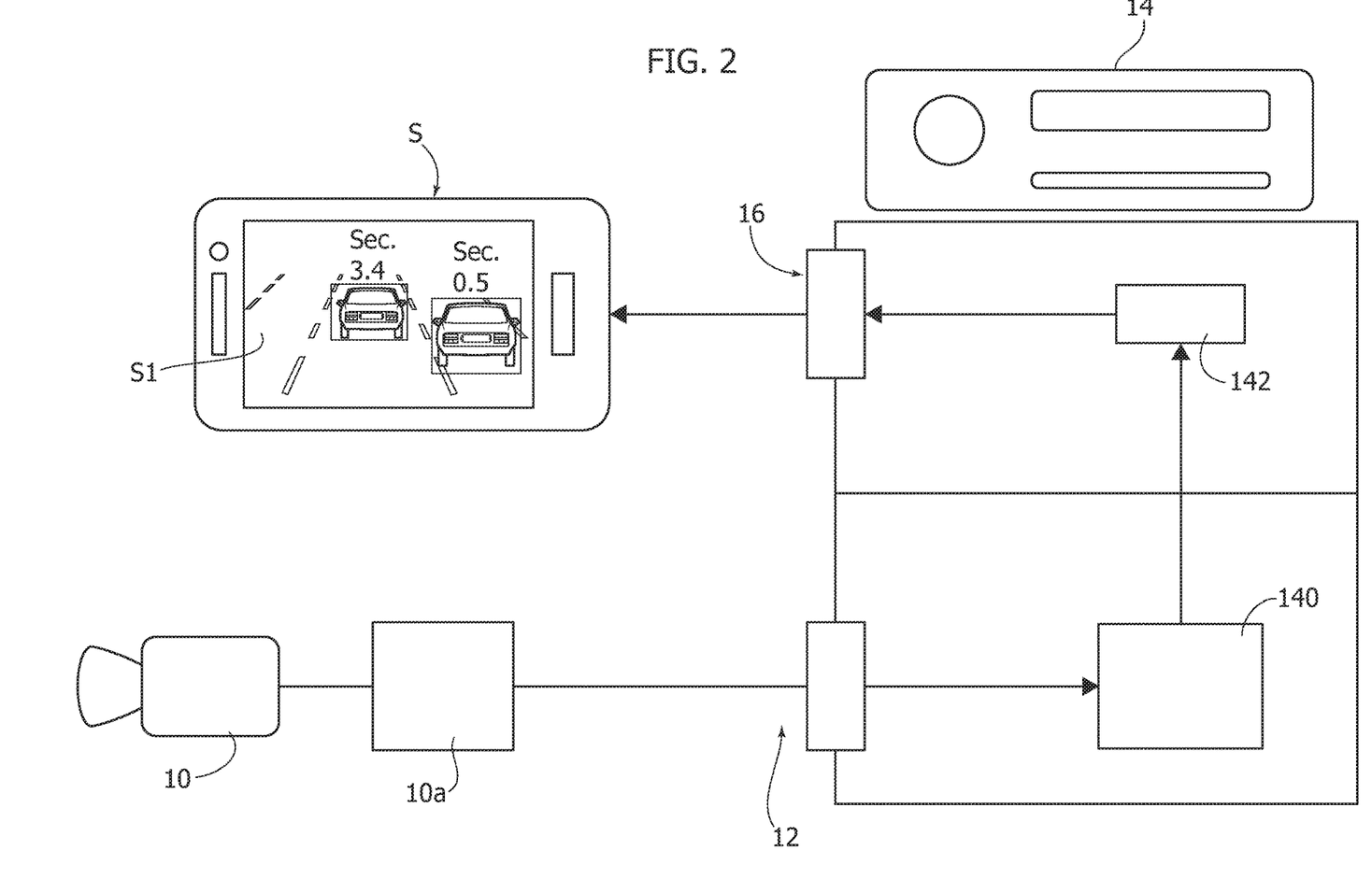
FIG. 2 is a block diagram exemplary of a system based on embodiments.

In one or more embodiments, the front view camera 10 can be installed at any known location for that purpose (e.g. on top of the vehicle dashboard, on the inner surface of the windscreen by suction cup or adhesive-tape mount, and so on) with the capability of sending video frames to the radio 14 over the connection 12. In one or more embodiments, an analog video decoder 10a may be associated with the camera 10 for that purpose.

In one or more embodiments, such an arrangement may permit to avoid using a separate camera, with the function of the front view camera 10 provided by a camera as currently available in mobile communication devices such as the mobile device S, with the video frames from that camera supplied (directly) to the video signal handling circuitry S2 in the device S with handling of these frames by the video signal handling circuitry of the mobile communication device S taking place (e.g. as exemplified in the following) under the control of the radio equipment, e.g. with the radio equipment 14 sensing certain operational conditions of the vehicle V (e.g. an abrupt deceleration) and correspondingly actuating the signal handling circuitry S2 of the mobile communication device e.g. in order to implement automatic ADAS safeguards, by possibly taking over control of the vehicle. In various embodiments, the video signal handling circuitry S2 in the device S may be a microprocessor executing instructions stored in a non-volatile memory coupled to the microprocessor or alternately a dedicated circuit designed to perform some or all of the functions of the video signal handling circuitry S2.

In one or more embodiments, the radio 14 can receive over the connection 12 video frames generated from the front view camera 10, e.g. using a Graphic accelerator or a video input port 140 (e.g. Accordo2 Smart Graphic Accelerator SGA and Video Input Port, which are capable of "grabbing" frames in YUV format such as YUV422) and output them e.g. as RGB frames to be sent, possibly after optional compression (e.g. at a compressor 142 such as a Cortex R4-based compressor), to the device S (e.g. a smart phone) over the connection 16.

In one or more embodiments, a radio 14 such as e.g. a 1DIN radio can be (already) configured—in a manner known per se—to receive data/messages via a CAN subsystem or any other interface (input nodes Si) installed in the vehicle V and send to the device S corresponding messages, e.g. by using a dedicated protocol.

A Controller Area Network (CAN) bus is a known standard which enables communication between devices such as microcontrollers and other devices. While originally devised for other electrical wiring applications, it is extensively used in vehicles due e.g. to good noise immunity and the possibility of saving on copper. Also, being a message-based approach, a host computer is not required.

The radio 14 can be coupled to the vehicle infrastructure via a CAN subsystem and thus receive diagnostic messages coming from the vehicle. For instance, the status of the doors, the status of the lights, temperature, reverse activation, vehicle speed and other information items are sent via the CAN subsystem so that the radio 14 can receive them and react accordingly.

In one or more embodiments, the device S (hereinafter a smart phone will be mostly referred to for simplicity) can receive from the car radio 14 over the connection 16 video frames generated from the front view camera 10 as well as signals/messages coming from the radio 14 about the operation status of the vehicle as sensed—in manner known per se—at the radio 14. The device S may handle these signals at the input nodes Si (e.g. as discussed previously and as further exemplified in the following) according to any ADAS functions as desired and provide them as ADAS-processed signals (at the output nodes Ai), with the capability of optionally displaying corresponding information on the screen S1.

In one or more embodiments, the smart phone (or other mobile communication device) S may thus be in charge of receiving video frames and/or other vehicle status information from the car radio 14 and evaluate these frames by performing ADAS functions (e.g. vehicle recognition, pedestrian recognition, road signal recognition), while also receiving/decoding signals/messages coming from the radio about the vehicle status.

In one or more embodiments, the radio (e.g. 1DIN) 14 may be in charge of receiving video frames from a camera, compressing it (if needed) and sending it to the smart phone (or other mobile communication device) S. The radio 14 can receive messages e.g. via a CAN subsystem (or any other interface) from the car and inform the smart phone accordingly via messages (e.g. by using a dedicated protocol).

In one or more embodiments, any of a set of ADAS applications on the device (e.g. smart phone) S can be triggered when the device is plugged into the car (e.g. to provide mobile communication contact synchronization as currently performed in SIM Access Profile (SAP) procedures.

It will be otherwise appreciated that the device S may per se be distinct from one or more embodiments.

The device S may simply be a mobile communications device ("user equipment") including a video-quality screen S1 and associated circuitry S2 (e.g. a smart phone, a tablet, a watch or any other type of portable/wearable device) as carried/worn by a driver and capable of being configured—in a manner known per se—for receiving from the radio 14 video frames generated from the front view camera 10 and displaying them on the screen S1.

Various (identical or different) options can be considered for both connections 12 and 16.

In one or more embodiments, the connection 12 of the camera 10 to the radio 14 may include a RCA connector (composite video)

In one or more embodiments, the connection 12 of the camera 10 to the radio 14 may be in compliance with the ITU-R BT 656 standard.

While not mandatory, in one or more embodiments, the connection 12 of the camera 10 to the radio 14 may include a wired connection. This may facilitate installation being entrusted to a qualified operator, also in view of possible certification. Also such a wired connection, included in the vehicle "harness", may be less exposed to undesired tampering.

In one or more embodiments, the connection 16 of the radio 14 to the device (smart phone) 10 may include a USB or WiFi (e.g. Bluetooth) connection.

While not mandatory, in one or more embodiments, such connection 16 may exploit a communication channel already provided (e.g. for hands-free phone calls).

In one or more embodiments any of a variety of ADAS applications ("apps") can be loaded to the smart phone S to be triggered as a result of a certain conditions or status detected.

These conditions/status can be sensed by the radio 14 e.g. by being connected to the vehicle CAN subsystem.

In one or more embodiments a circuit essentially corresponding to blocks 140 and 142 of FIG. 2 (including circuit elements providing interfacing with the connections 12 and 16) can be integrated into an otherwise conventional car radio 14, e.g. Accordo2™ as available with companies of the ST Group.

Accordo2™ is a family of devices that provide a cost effective microprocessor solution for modern automotive car radio systems, with an embedded powerful Digital Sound Processing subsystem, as well as a MIPS efficient ARM Cortex-R4 processor and an ARM Cortex-M3 controller dedicated for real-time CAN/Vehicle Interface Processing.

Accordo2™ family devices come with a set of common interfaces (UART/I2S/I2C/USB/MMC) which facilitates implementing a feature-rich system as well as a cost effective solution, bundled with a software package, which facilitates fast system implementation.

Accordo2™ family devices can manage an audio chain from analog or digital inputs to analog or digital outputs, including digital audio media decoding, sample rate conversion among various sources, intelligent routing and audio effects/DSP post processing.

A flexible memory configuration facilitates implementing from very low cost systems based on real time OS, scaling up to demanding applications based on Linux OS.

Accordo2™ family devices are easily configurable in such a way that the vehicle being driven in reverse ("reversing") is detected to facilitate activation of the front view camera system described (only) during reversing.

Figure 3:
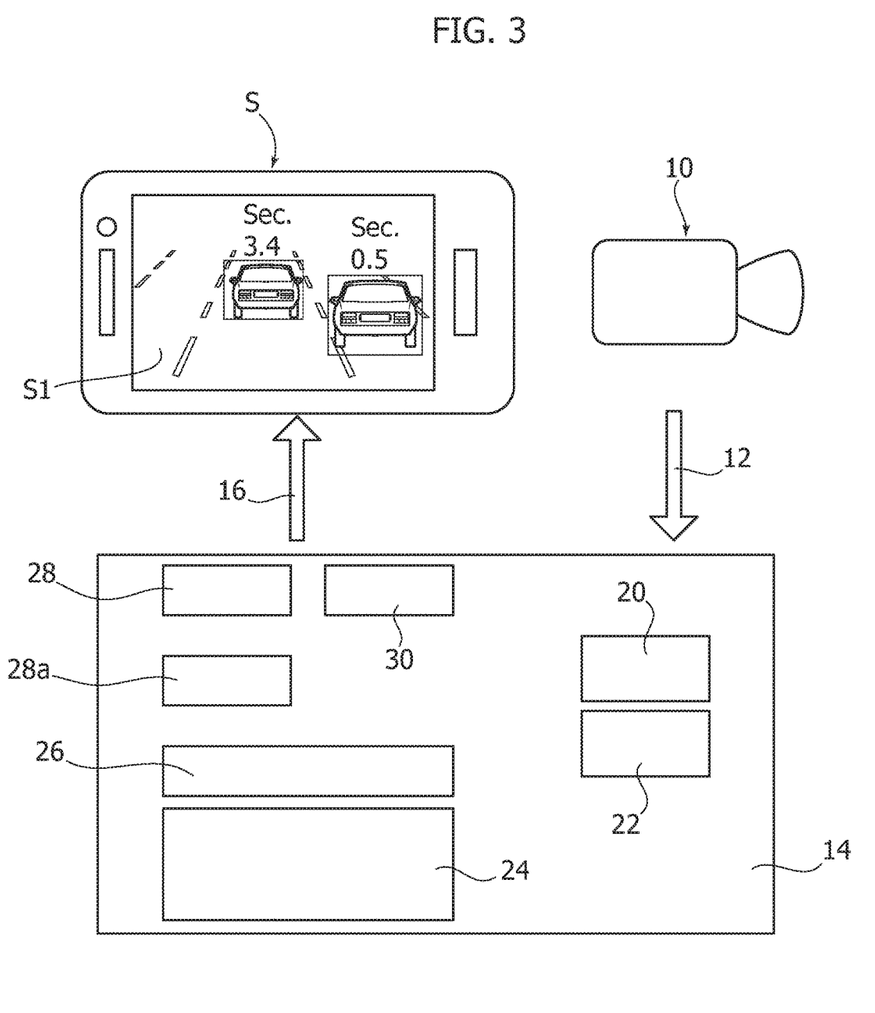
FIG. 3 is a block diagram exemplary of a system architecture based on embodiments.

The block diagram of FIG. 3 represents a possible software architecture of one or more embodiments adapted for implementation e.g. in Accordo2™ family devices.

Such architecture may provide a frame path from the camera 10 to the device (e.g. smart phone) S such that video frames from the camera 10 can be received at the radio 14 over the connection 12 e.g. via a video input port (VIP) driver 20 and processed (e.g. STGLib) at 22.

A smartphone connectivity stack 24/USB stack 26 can be exploited to send the images form the camera 10 to the smart phone (or another screen-equipped device) S over the connection 16 (e.g. a USB connection).

Protocol features between the smart phone S and the radio 14 can include both EAP 28 (over iAp—28a)—for iOS devices—and AOA 30—for Android devices.

Those of skill in the art will appreciate that similar features can be extended (in manner known per se) to any input signal/message of interest for ADAS operation.

Figure 4:
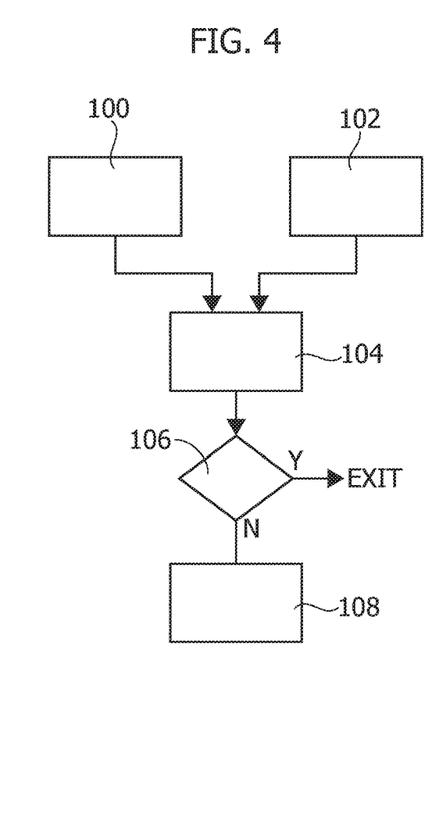
FIGS. 4 to 6 are flow charts exemplary of possible operation of embodiments.
Figure 5:
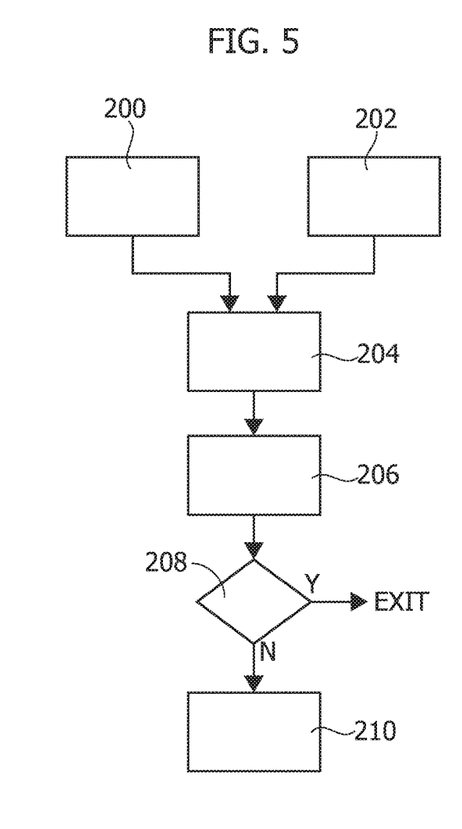
Figure 6:
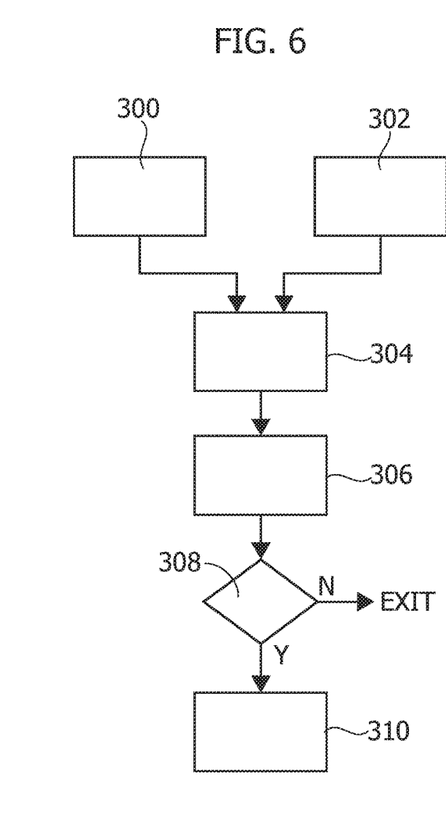

FIGS. 4 to 6 are flow charts exemplary of possible operation of embodiments.

FIG. 4: Cross line detection

At 100, the camera 10 sends one or more video frames indicative of the position of the vehicle V with respect to a roadway side line to the radio 14, which, at 102, receives a turn indicator status (from a respective one of the nodes Si) via CAN or via any other protocol and, at 104, sends it, together with the frame(s), to the smart phone S.

If the turn indicator has been activated by the user and the video frame(s) indicate that the roadway line has been crossed (outcome Y from a combined check step 106) an associated smart phone ADAS application, operating in manner known per se, will not notify any alert message (EXIT).

If, conversely, the turn indicator has not been activated by the user and the roadway line has been crossed (outcome N from the combined check step 106), at 108, the smart phone application will notify an alert message e.g. sending a chime signal (as an ADAS output Ai) to the radio 14 that will use e.g. car speakers to reproduce the sound and inform the driver.

FIG. 5—Speed Alert

At 200, the camera S sends one or more video frames showing a road signal indicating a speed limit to the radio which, at 202, receives speedometer data (from a respective one of the sensors Si, e.g. odometer) via CAN or via any other protocol and, at 204, sends it together with the frame(s) to the smartphone S.

At 206, an associated smartphone ADAS application, operating in manner known per se, will recognize the speed road signal and process it to derive the speed limit value.

If the speedometer data received from the radio 14, which is indicative of the current vehicle speed, is under the speed limit read (outcome Y from a check step 208) the smart phone application will not notify any alert message (EXIT).

If, conversely, the speedometer data received from the radio 14 indicates a current vehicle speed exceeding the speed limit (outcome N from the check step 208) the smart phone application will notify), at 210, an alert message e.g. sending a chime signal (as an ADAS output Ai) to the radio 14 that will use e.g. car speakers to reproduce the sound and inform the driver.

FIG. 6—Collision Alert

At 300, the camera S sends one or more video frames showing a preceding vehicle to the radio which, at 302, receives speedometer data (from a respective one of the sensors Si, e.g. odometer) via CAN or via any other protocol and, at 304, sends it together with the frame(s) to the smartphone S.

At 306, an associated smartphone ADAS application, operating in manner known per se, will perform video frame processing by providing an estimate of the distance and/or the relative speed to the preceding vehicle, while also sensing the speedometer data received from the radio 14, which is indicative of the current vehicle speed.

If such processing indicates that no risk of collision exists (outcome N from a check step 308) the smart phone application will not notify any alert message (EXIT).

If, conversely, such processing indicates that the driver is too close to preceding vehicle and/that the driver is proceeding too fast so that risk of collision subsists (outcome Y from the check step 308) the smart phone application will notify), at 310, an alert message e.g. sending a chime signal (as an ADAS output Ai) to the radio 14 that will use e.g. car speakers to reproduce the sound and inform the driver.

In one or more embodiments, in addition or as an alternative to a sound signal (e.g. chimes) such alert messages can be displayed as visual messages e.g. on the screen S1 of the mobile device S.

In one or more embodiments, a method may include: providing at least one camera (e.g. 10, 10i) on a vehicle (e.g. a motor vehicle, such as a motor car V); supplying (e.g. 12, 16; 100, 200, 300) video frames from the at least one camera to video signal handling circuitry (e.g. S2) in a mobile communication device (e.g. a device S as carried or worn by the vehicle driver); and actuating (e.g. 104, 106; 204, 206, 208; 304, 306) the video signal handling circuitry in the mobile communication device supplied with video frames from the at least one camera to produce (e.g. 108, 210, 308) driver assistance signals (e.g. Ai) as a function of video frames from the at least one camera (and, possibly, of other input signals Si).

One or more embodiments may include: equipping the vehicle with a (car) radio equipment (e.g. 1DIN car radio 14); and supplying video frames from the at least one camera to the video signal handling circuitry in the mobile communication device, wherein the video signal handling circuitry of the mobile communication device produces driver assistance signals as a function of video frames from the at least one camera (and, possibly, of other input signals Si) under the control of the radio equipment.

One or more embodiments may include the radio equipment: sensing at least one operational status of the vehicle; and actuating the video signal handling circuitry of the mobile communication device as a result of said at least one operational status of the vehicle sensed at the radio equipment.

One or more embodiments may include: receiving (e.g. 12) video frames from the at least one camera at the radio equipment; and transmitting (e.g. 16) video frames received at the radio equipment from the at least one camera to the mobile communication device equipped with video signal handling circuitry.

One or more embodiments may include displaying on a video screen (e.g. S1) of the mobile communication device driver assistance signals produced by the video signal handling circuitry in the mobile communication device as a function of video frames from the at least one camera (and, possibly, of other input signals Si).

In one or more embodiments, the at least one camera may include a front view camera (10).

In one or more embodiments, a system may include: at least one camera for mounting on a vehicle equipped with a radio equipment; and the radio equipment configured for at least one of: i)—sensing at least one operational status of the vehicle and causing video frames from the at least one camera to be supplied to video signal handling circuitry in a mobile communication device as a result of said at least one operational status of the vehicle sensed at the radio equipment; and/or ii)—receiving at the radio equipment video frames from the at least one camera and transmitting video frames received at the radio equipment from the at least one camera to video signal handling circuitry in a mobile communication device. The video signal handling circuitry in the mobile communication device may be activated for producing driver assistance signals as a function of video frames from the at least one camera.

One or more embodiments may include a wired connection between the at least one camera and the radio equipment.

In one or more embodiments, the radio equipment may include a WiFi or USB transmitter configured for transmitting to a mobile communication device video frames received from the at least one camera.

In one or more embodiments, a circuit for inclusion in vehicle radio equipment may include: a video signal receiver circuit block (e.g. 140) configured for receiving video signals conveying video frames from at least one vehicle camera; and a video signal transmitter circuit block (e.g. 142) configured for transmitting video frames received at the radio equipment from the at least one camera to a mobile communication device equipped with video signal handling circuitry thereby making video frames from the at least one camera available to the video signal handling circuitry of the mobile communication device to produce driver assistance signals as a function of video frames from the at least one camera (and, possibly, of other input signals Si) under the control of the radio equipment.

In one or more embodiments, the circuit may be configured for sensing at least one operational status of the vehicle and actuating the video signal handling circuitry of the mobile communication device as a result of said at least one operational status of the vehicle (V) sensed at the radio equipment.

In one or more embodiments, a kit may include at least one camera as well as radio equipment for mounting on a vehicle, the radio equipment including: a video signal receiver circuit block configured for receiving video signals conveying video frames from the at least one camera mounted on said vehicle; and a video signal transmitter circuit block configured for transmitting video frames received at the radio equipment from the at least one camera to a mobile communication device equipped with video signal handling circuitry, thereby making video frames from the at least one camera available to the video signal handling circuitry of the mobile communication device to produce driver assistance signals as a function of video frames from the at least one camera under the control of the radio equipment.

One or more embodiments may include a vehicle (e.g. a motor car) equipped (as OEM feature or by way of retrofitting) with a system according to one or more embodiments.

Without prejudice to the underlying principles, the details and embodiments may vary, even significantly, with respect to what has been described by way of example only, without departing from the extent of protection.

The extent of protection is defined by the annexed claims.

What is claimed is:

1. A method comprising:
    installing a front view camera on a front side of a vehicle, the front view camera being mounted on a dashboard or windscreen of the vehicle;
    providing video frames captured at the front side of the vehicle to an analog video decoder separate from the front view camera,
    providing video frames from the analog video decoder in a first format to an input of a radio equipment without a LCD display for displaying an output from the camera, the radio equipment being separate from the analog video decoder and being connected to the front view camera through a vehicle harness,
    compressing, at the radio equipment, the video frames into a second format,
    receiving, at the radio equipment, an operational status of the vehicle through a Controller Area Network (CAN) bus of the vehicle,
    using a dedicated protocol, supplying the operational status and the compressed video frames to video signal handling circuitry in a mobile communication device; and
    actuating the video signal handling circuitry in the mobile communication device to process the compressed video frames at the video signal handling circuitry to produce driver assistance signals based on the compressed video frames and the operational status, wherein producing the driver assistances signals comprise
        at the mobile communication device, determining that a speedometer data indicates that vehicle speed is higher than a speed limit value of a road, and
        sending chime signals to the radio equipment upon determining that the speedometer data indicates that the vehicle speed is higher than the speed limit value of the road.

2. The method of claim 1, further comprising:
    equipping the vehicle with radio equipment; and
    supplying the video frames from the camera to the video signal handling circuitry in the mobile communication device, wherein the video signal handling circuitry of the mobile communication device produces driver assistance signals based on the video frames from the camera controlled by the radio equipment.

3. The method of claim 2, further comprising:
    transmitting the video frames received at the radio equipment to the mobile communication device equipped with video signal handling circuitry, wherein the dedicated protocol comprises a USB or WiFi connection.

4. The method of claim 1, wherein the operational status comprises status of a vehicle door, status of a vehicle light, temperature, reverse activation, or vehicle speed.

5. The method of claim 1, wherein a connection between the camera and the radio equipment is a wired connection that is compliant with ITU-R BT 656 standard.

6. The method of claim 1 further comprising displaying, on a video screen of the mobile communication device, driver assistance signals produced by the video signal handling circuitry in the mobile communication device as a function of the video frames from the camera.

7. The method of claim 1, wherein the camera is activated when the vehicle is reversed.

8. A system comprising:
    a front view camera for mounting on a dashboard or windscreen at a front side of a vehicle equipped with a radio equipment without a LCD display for displaying an output from the camera, the front view camera being connected to the radio equipment through a vehicle harness,
    an analog video decoder coupled to the front view camera and having an output coupled to the radio equipment,
    wherein the radio equipment comprises a microprocessor and a memory storing instructions, the instructions when executed by the microprocessor are configured to receive an operational status of the vehicle through a Controller Area Network (CAN) bus of the vehicle, receive video frames from the camera through the analog video decoder in a first format, compress the video frames into a second format, cause the operational status and the compressed video frames to be supplied to video signal handling circuitry in a mobile communication device using a dedicated protocol, and cause the microprocessor to transmit the video frames to the video signal handling circuitry in the mobile communication device, wherein the video signal handling circuitry in the mobile communication device is configured to be activated for producing driver assistance signals as a function of video frames from the camera and the operational status, wherein the video signal handling circuitry in the mobile communication device is configured to send a chime signal to the radio equipment when a turn indicator has not been activated and a roadway line has been crossed and not send any chime signal to the radio equipment when a turn indicator is activated and the roadway line has been crossed, send a chime signal to the radio equipment when a speedometer data indicates that vehicle speed is higher than a speed limit value of a road and not send any chime signal to the radio equipment when the speedometer data indicates that the vehicle speed is under the speed limit value, and send a chime signal to the radio equipment when it is determined that there is a risk of collision and not send any chime signal to the radio equipment when it is determined that there is no risk of collision, wherein the radio equipment includes a USB transmitter configured for transmitting the video frames to the mobile communication device.

9. The system of claim 8, wherein the operational status comprises status of a vehicle door, status of a vehicle light, temperature, reverse activation, or vehicle speed.

10. A vehicle equipped with the system according to claim 8.

11. The system of claim 8, wherein the dedicated protocol comprises a USB or WiFi connection.

12. The system of claim 11, wherein the radio equipment includes a WiFi or USB transmitter configured to transmit the video frames received from the front view camera to the mobile communication device.

13. The system of claim 8, wherein the vehicle harness comprises a wired connection between the camera and the radio equipment, the wired connection being compliant with ITU-R BT 656 standard.

14. A vehicle equipped with the system according to claim 13.

15. A kit comprising:

a front view camera for mounting on a dashboard or windscreen at a front side of a vehicle;

an analog video decoder coupled to the camera, the analog video decoder being separate from the front view camera; and a radio equipment for mounting on the vehicle and having an input to be coupled to the analog video decoder, the radio equipment being separate from the analog video decoder, the radio equipment having no LCD display for displaying an output from the camera, the radio equipment comprising a microprocessor and a memory storing instructions, the instructions when executed by the microprocessor are configured to receive an operational status of the vehicle through a Controller Area Network (CAN) bus of the vehicle, receive video frames from the camera through the analog video decoder in a first format, compress the video frames into a second format, and cause the operational status and the compressed video frames to be supplied to video signal handling circuitry in a mobile communication device using a dedicated protocol, wherein the video signal handling circuitry in the mobile communication device is configured to be actuated to process the compressed video frames at the video signal handling circuitry to produce driver assistance signals based on the compressed video frames and the operational status, wherein producing the driver assistances signals comprise at the mobile communication device, determining that a speedometer data indicates that vehicle speed is higher than a speed limit value of a road, and sending chime signals to the radio equipment upon determining that the speedometer data indicates that the vehicle speed is higher than the speed limit value of the road.

16. The kit of claim 15, wherein the driver assistance signals comprise an alert message based on determination of cross line detection, speed detection, or collision detection.

* * * * *